US005241987A

United States Patent [19]

Ohmi et al.

[11] Patent Number: 5,241,987

[45] Date of Patent: Sep. 7, 1993

[54] PROCESS GAS SUPPLYING APPARATUS

[75] Inventors: Tadahiro Ohmi, 1-17-301, Komegabukuro 2-chome, Aoba-ku, Sendai-shi, Miyagi-Ken 980; Kazuhiko Sugiyama, Sendai; Fumio Nakahara, Tokyo, all of Japan

[73] Assignee: Tadahiro Ohmi, Miyagi, Japan

[21] Appl. No.: 773,893

[22] PCT Filed: Oct. 4, 1989

[86] PCT No.: PCT/JP89/01014

§ 371 Date: Dec. 2, 1991

§ 102(e) Date: Dec. 2, 1991

[87] PCT Pub. No.: WO90/12641

PCT Pub. Date: Nov. 1, 1990

[30] Foreign Application Priority Data

Apr. 26, 1989 [JP] Japan ................................ 1-107979

[51] Int. Cl.[5] ................................ F16K 11/10

[52] U.S. Cl. ................................ 137/597

[58] Field of Search ............... 137/606, 607, 595, 597; 73/1 G

[56] References Cited

U.S. PATENT DOCUMENTS 3,417,779 12/1968 Golay ................ 137/597 X
4,062,373 12/1977 Clark et al. ................ 137/607 X
4,257,439 3/1981 Mayeaux ................ 73/1 G
4,392,514 7/1983 Farley et al. ................ 137/607 X
4,546,794 10/1985 Ball ................ 137/607 X
4,605,034 8/1986 Urushida ................ 137/607 X

FOREIGN PATENT DOCUMENTS 43-1065 1/1968 Japan .
45-12195 5/1970 Japan .
58-50530 11/1983 Japan .

*Primary Examiner*—Stephen M. Hepperle
*Attorney, Agent, or Firm*—Baker & Daniels

[57] ABSTRACT

When a process gas obtained by mixing a source gas with a diluting gas is supplied to a predetermined process apparatus, by supplying the process gas to the predetermined process apparatus through a gas contacting part connecting at least one source gas supplying pipe with at least one diluting gas supplying pipe, no chance that the source gas is exposed to air contamination is provided. Moreover, in particular, by forming the gas contacting part which is to be in contact with the above source gas, diluting gas and the like using such a material as metal, ceramic or the like, emission of materials having bad influences on the process gas, such as organic materials in particular, is eliminated. Furthermore, by providing a branching pipe or exhausting pipe, the degree of diluting the source gas can be varied stepwise, and by further combining with a flow rate adjuster, it can be varied continuously.

7 Claims, 13 Drawing Sheets

PROCESS GAS SUPPLYING APPARATUS

TECHNICAL FIELD

This invention relates to a process gas supplying apparatus to be used in various film forming processes and in a dry etching process for forming fine patterns, and in particular, to an apparatus where a source gas is mixed with a balance gas to prepare a process gas with a desirable concentration enabling the formation of high quality films and high quality etching, and the process gas is supplied to a process apparatus.

BACKGROUND OF THE INVENTION

In recent years, in the process of forming high quality thin films and in dry etching process for forming fine patterns, it is becoming more and more important that the process atmosphere be ultra high clean, that is, a technique for supplying an ultra high pure gas to a process apparatus.

For example, regarding a semiconductor device, the size of unit elements are becoming smaller and smaller year by year in order to increase the degree of integration of integrated circuits, and research and development for realizing semiconductor devices having a size of from 1 mm to a submicron size, or even a size of not more than 0.5 mm, is carried out actively. The production of such a semiconductor device is achieved by repeating such processes as forming thin films or etching the thin films to a predetermined circuit pattern. It has been becoming usual that such processes are carried out by putting silicon wafers into a process chamber and under a reduced pressure atmosphere to which a predetermined gas is introduced. The purpose of the reduced pressure state is to increase the mean free path of the gas molecules and to control the gas phase reaction for etching or packing through-holes or contact holes having a high aspect ratio.

When an impurity is mixed with the reaction atmosphere of these processes, such problems occur that the quality of thin films deteriorates, that the process precision in etching is not sufficient, that the selectivity deteriorates, and that the adhesivity between the thin films becomes insufficient. In order to produce integrated circuits having patterns of a submicron or a lower submicron size on a large diameter wafer at a high density and high production yield, the reaction atmosphere contributing to the film formation and etching must be controlled completely. This is why a technique for supplying an ultra high pure gas is important.

As gasses to be used in a semiconductor producing apparatus, there are general gasses which are relatively stable, such as $N_2$, Ar, He, $O_2$, $H_2$, and special material gasses which are highly toxic, spontaneously combustible and corrosive, such as $AsH_3$, $PH_3$, $SiH_4$, $Si_3H_5$, HCl, $NH_3$, $Cl_2$, $CF_4$, $SF_6$, $NF_6$, $WF_6$ and $F_2$.

Since the general gasses can be handled relatively easily, they are in most cases fed under pressure from a purification apparatus directly to a semiconductor producing apparatus, and by developing and improving containers, purification apparatuses and piping materials, it has become possible to supply ultra high pure gasses (Tadahiro Ohmi, "Challenge against ppt—Gas piping system for gasses for semiconductors challenging ppt impurity concentration", Nikkei Micro Device, July 1987, pp. 98–119).

On the other hand, the special gasses require sufficient attention in handling Since the amount of the special gasses used is small, they are in most cases contained in cylinders and fed under pressure through a cylinder cabinet piping apparatus to the semiconductor producing apparatus.

In connection to this, in the case of the special material gasses, they are usually diluted with a diluting gas (balance gas) to a low concentration to obtain process gasses, and they are contained in cylinders. A process gas supplying apparatus is constructed in such a manner that a process gas is supplied from a cylinder to the process apparatus. Therefore, the cylinder is changed with a new one, as frequently as once in a month or a week, so that even when a cylinder improved in respect to the inner surface contamination is used, the inside of the gas supplying piping system is contaminated with the atmosphere penetrating into it. Moreover, although a technique for filling an ultra high pure gas is established, the purity of the gas contained in the cylinder becomes lower than that before the filling. Furthermore, the changing of the cylinder requires man power, so that the production cost increases.

When the process gas to be supplied to the process apparatus is contaminated, the processes are influenced profoundly. For example, in an Al-film formation technique (T. Ohmi. H. Kuwabara, T. Shibata and T. Kiyota, "RF DC coupled mode bias sputtering for ULSI metallization", S. Broydo and C.M. Osburn, Ed., "ULSI Science and Technology/1987", The Electrochemical Society Inc., Philadelphia 1987, Proc. Vol. 87–11, pp. 574–592, and Tadahiro Ohmi, "Al film formation conditions completely eliminating impurities and preventing generation of hillock are found", Nikkei Micro Device, October, 1987, pp. 109–111), when water is contained at a concentration of 10 ppb in an Ar sputter atmosphere, the morphology of Al film surface deteriorates. In such a state, it is impossible to optimize the film formation parameters of Al whose resistance is the same as that of bulk Al and which is free from generating hillock at heat-treatment. Moreover, when this film formation technique is applied to the formation of Si films, even when other film formation conditions are kept the same, only amorphous films are obtained if the process atmosphere is contaminated with gasses released from the inner surface of the chamber (T. Ohmi, T. Ichikawa, T. Shibata, K. Matsudo and H. Iwabuchi, "In Situ Substrate-Surface Cleaning for Very Low Temperature Silicon Epitaxy by Low-Kinetic-Energy particle Bombardment", Appl. Phys. Lett., 53, 4 July (1988), and T. Ohmi, T. Ichikawa, T. Shibata, K. Matsudo and H. Iwabuchi, "Low-Temperature Silicon Epitaxy by Low-Energy Bias-Sputtering", Appl. Phys. Lett., Aug. 1, (1988)).

Furthermore, when Si thin films are formed by means of reduced pressure CVD, if the water content exceeds 10 ppb, neither selective growth nor epitaxial growth takes place (Junichi Murota, Naoto Nakamura, Manabu Kato, Nobuo Mikoshiba and Tadahiro Ohmi, "Ultra clean CVD technique having high selectivity", Abstracts of Oral Presentations [Process Technology for Higher Performance III], The 6th Ultra LSI Ultra Clean Technology Symposium, January 1988, pp. 215–226).

Furthermore, the conventional process gas supplying apparatus employees such methods that the gas flow rate is controlled by selecting the number of capillaries through which the gas flows by changing some of them, or that the flow rates of two gasses to be mixed with each other are controlled by means of two float-type flowmeters or a mass flow controller. However, the dilution ratio in these methods is as small as one by several hundreds, and the gas contacting part is in most cases too dirty to supply an ultra high pure gas. For example, when a gas of a concentration of from several ppm to several tens of ppm is to be supplied to the process apparatus, if a 100% source gas is supplied from a cylinder, the source gas has to be diluted to a degree of one by ten thousand or one by one hundred thousand with a balance gas.

The present invention has been achieved in view of the above situation, and an object of the invention is to realize a gas supplying system which easily supplies a process gas without being influenced by atmosphere contamination and which is almost free from releasing gasses having undesirable influences on the Processes, such as water, organic materials and the like, and to provide a highly clean and high performance process gas supplying apparatus.

DISCLOSURE OF THE INVENTION

According to the present invention a source gas and a diluting gas are supplied independently and mixed with each other to yield a process gas in the neighborhood of a process apparatus. On the other hand, the source gas and a balance gas in the generation process of said process gas are diluted to a desired concentration by means of each flow rate controlling means.

According to the present invention impurities due to the gasses released from the surface of the gas contacting part are decreased, and an ultra high clean and high performance process gas can be supplied to the process apparatus.

According to the present invention by providing at least two branching pipes and an exhaust gas pipe, the dilution of the process gas can be achieved as desired at high efficiency and step-wise.

DESCRIPTION OF PREFERRED EMBODIMENT

Figure 1:
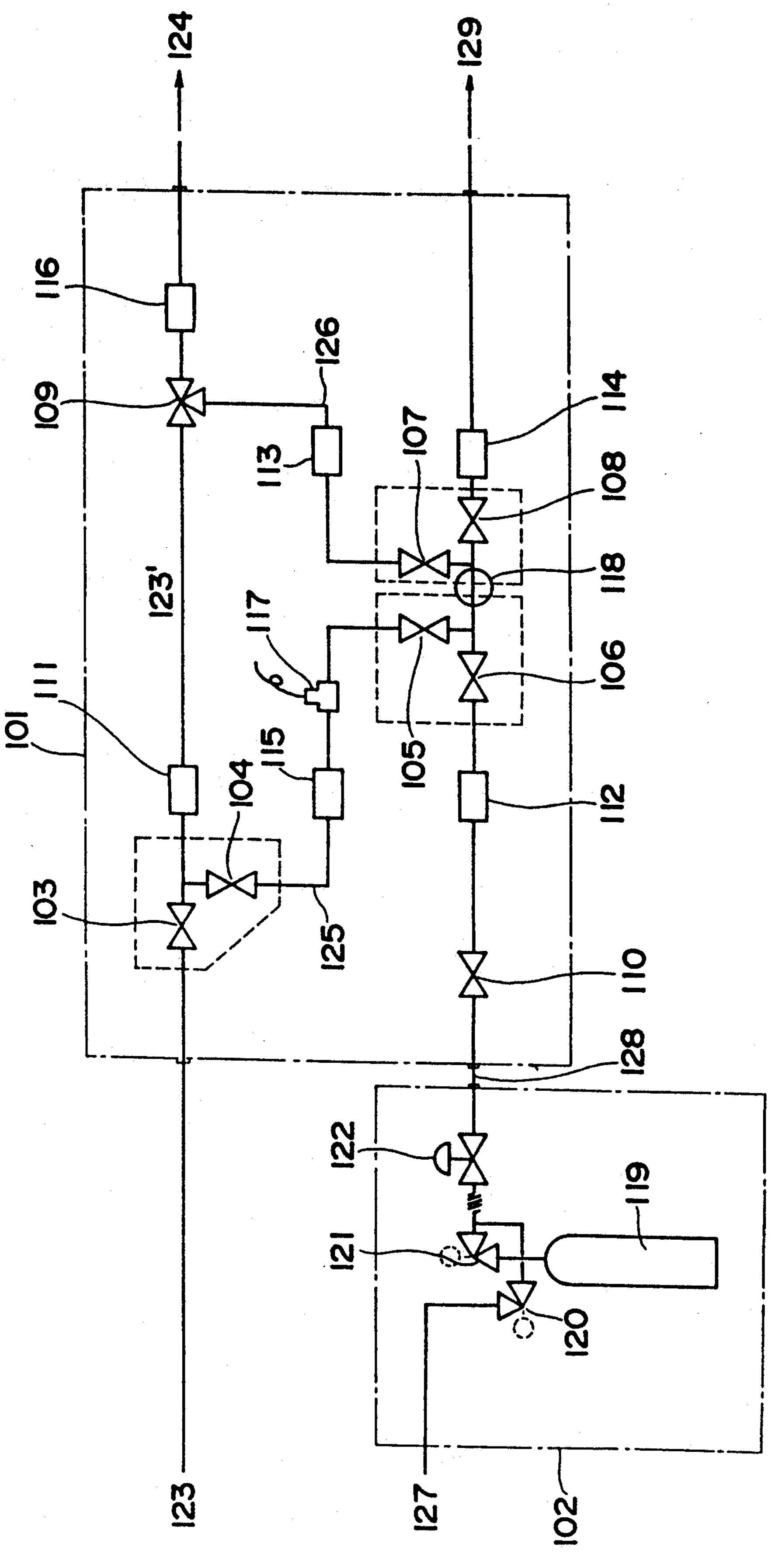
FIG. 1 is a block diagram showing the piping system of the process gas supplying apparatus according to the invention.

In the following, an example of the invention will be explained with reference to the appended drawings In FIG. 1, 101 is a gas diluting part, and 102 is a cylinder cabinet part for supplying an ultra high pure source gas. Herein, only the minimum number of elements to be required are indicated in order to simplify the explanation of the cylinder cabinet part 102. From the point of view of keeping the gas supplying system highly clean, the cylinder cabinet part 102 is preferably provided with a gas purge system. 103, 104, 105, 106, 107, 108 and 110 are stop valves. The stop valves 103 and 104, 105 and 106, and 107 and 108 are respectively a duplex three-directional valve in which two valves are combined, and 109 is a branch flow valve. All the valves 103, 104, 105, are all metal diaphragm valves including no organic material.

111, 112, 113 and 114 are mass flow controllers as flow adjusters, and in view of ease in actuation and gas replacement after providing pipings, they are preferably provided with a purging means. 115 and 116 are mass flow meters, and the above mass flow controllers 111, 112, 113 and 114, and the mass flow meters 115 and 116 are preferably of high performance having an accuracy of not less than 0.1% to the full-scale and a response time of not longer than 0.3 seconds.

117 is a pressure meter for checking the supplying pressure of a diluting gas (balance gas), and is used for setting a standard when the supplying pressure of source gas is adjusted. Herein, in view of keeping the gas supplying system highly clean, said pressure meter 117 preferably has a diaphragm type pressure sensor without any stagnation part. 118 is a piping for homogeneously mixing gasses, and 119 is a gas cylinder. This gas cylinder 119 is an ultra clean gas cylinder which inner surface is doubly polished for containing a high pure source gas. 120 and 121 are main valves for the gas cylinder 119, and are formed by monolithically combining two valves. 120 is a purge valve for purging the interior of the main valve with a purge gas, and 121 a gas supplying valve for supplying a source gas in the gas cylinder. Herein the purge gas is preferably the same kind of a gas as the balance gas, such as Ar, $H_2$, $N_2$, He or the like. 122 is a pressure adjuster provided for adjusting the supplying pressure of the source gas in the cylinder, and from the viewpoint of gas cleanliness, it is all metal made using a diaphragm type pressure sensor. 123 and 123' are balance gas supplying pipes for flowing a balance gas, such as Ar, $H_2$, $N_2$, He or the like. 124 is a process gas supplying pipe for supplying a process gas diluted to a predetermined concentration to the process apparatus. 125 is a balance gas branching pipe, and is a first connecting pipe to be used for a first dilution when dilution at a high dilution ratio is performed. 126 is a diluting gas supplying pipe for supplying a high concentration source gas, for the case of low dilution ratio, Or supplying a gas having been subjected to a first dilution, for the case of high dilution ratio, to the balance gas supplying pipe 123' for carrying out a second dilution. That is, said diluting gas supplying pipe 126 is connected to the above balance gas supplying pipe 123' through the valve 109, and is a second connecting pipe for supplying the process gas to the process gas supplying pipe 124. 127 is a purge gas supplying pipe for flowing a purge gas, such as Ar, $H_2$, $N_2$. He or the like, and is a gas pipe for purging the interior of source valve of the gas cylinder and the source gas supplying pipe of the cylinder 128 is a cylinder gas supplying pipe, and 129 is an exhaust pipe. The exhaust pipe 129 is used for exhausting excess gas, when a high diluting ratio dilution is performed, in order to subject the source gas having been subjected to a first dilution to a second dilution Using this pipe, source gas diluted to not higher than 0.5% is exhausted into the atmosphere after treating it with an exhaust gas treating apparatus.

Next, the functions and operating procedure of the above constructed process gas supplying apparatus are explained with reference to the appended drawings The pipes through which a gas flows are indicated by thick lines.

Figure 2:
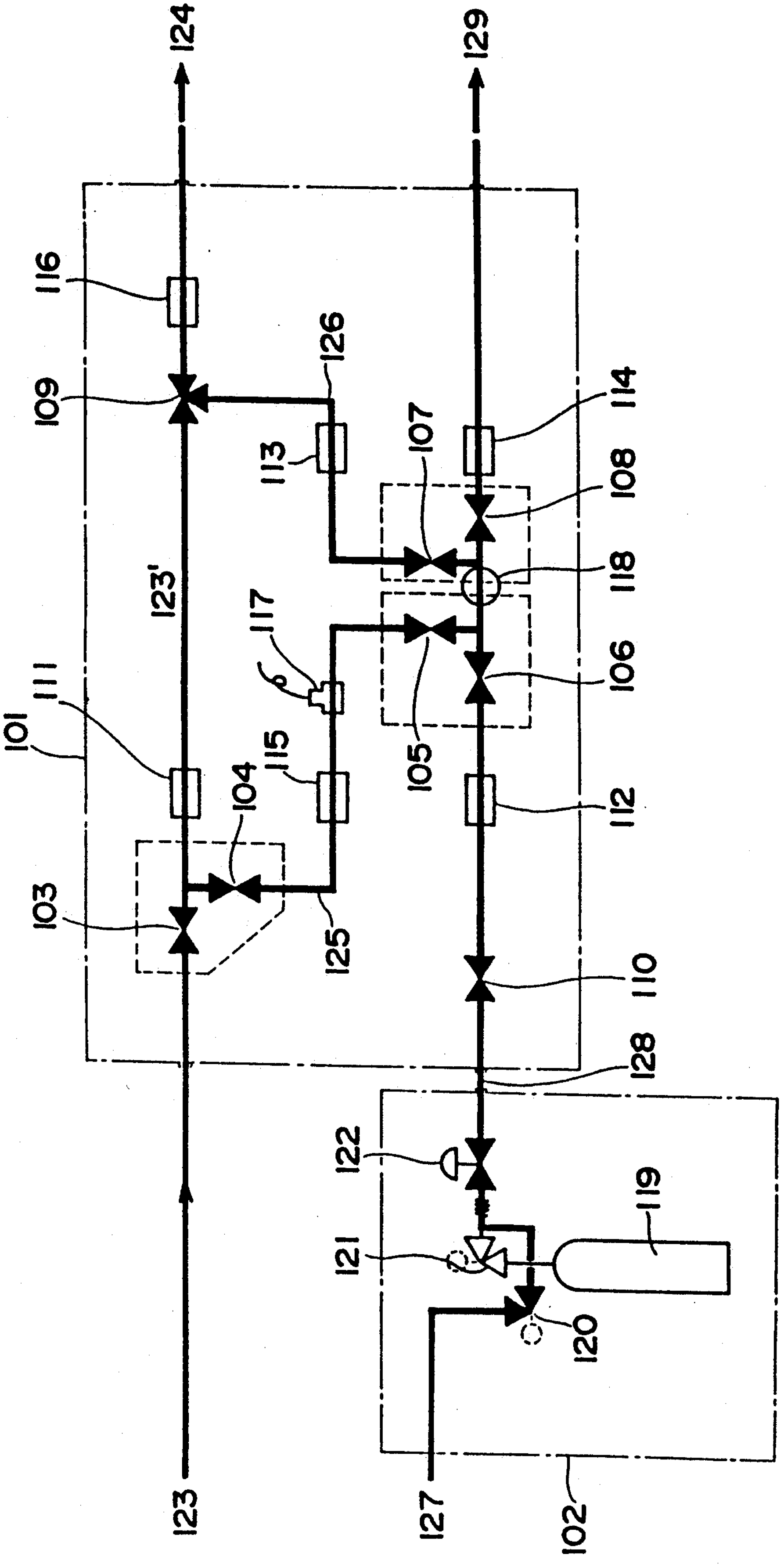
FIG. 2 is a drawing showing the flow of a gas purging in the apparatus shown in FIG. 1.

FIG. 2 shows the flow of a gas when the piping system is wholely purged. The valves 103, 104, 105, 106, 107, 108, 109, 110 and 120 are opened, and with the gas supplying valve 121 closed, the secondary pressure of the pressure adjuster 122 is set to a value of, for example, 0.5 [$Kg/cm^2$]−1.0 [$Kg/cm^2$] higher than the indication value of the pressure meter 117. The mass flow controllers 111, 112, 113 and 114 are set to a purge mode, and not less than 1 [l/min] of a purge gas, such as N, or Ar, or a balance gas, such as Ar, $H_2$, $N_2$, He or the like is flowed through each piping line to thereby purge the whole piping system.

Figure 3:
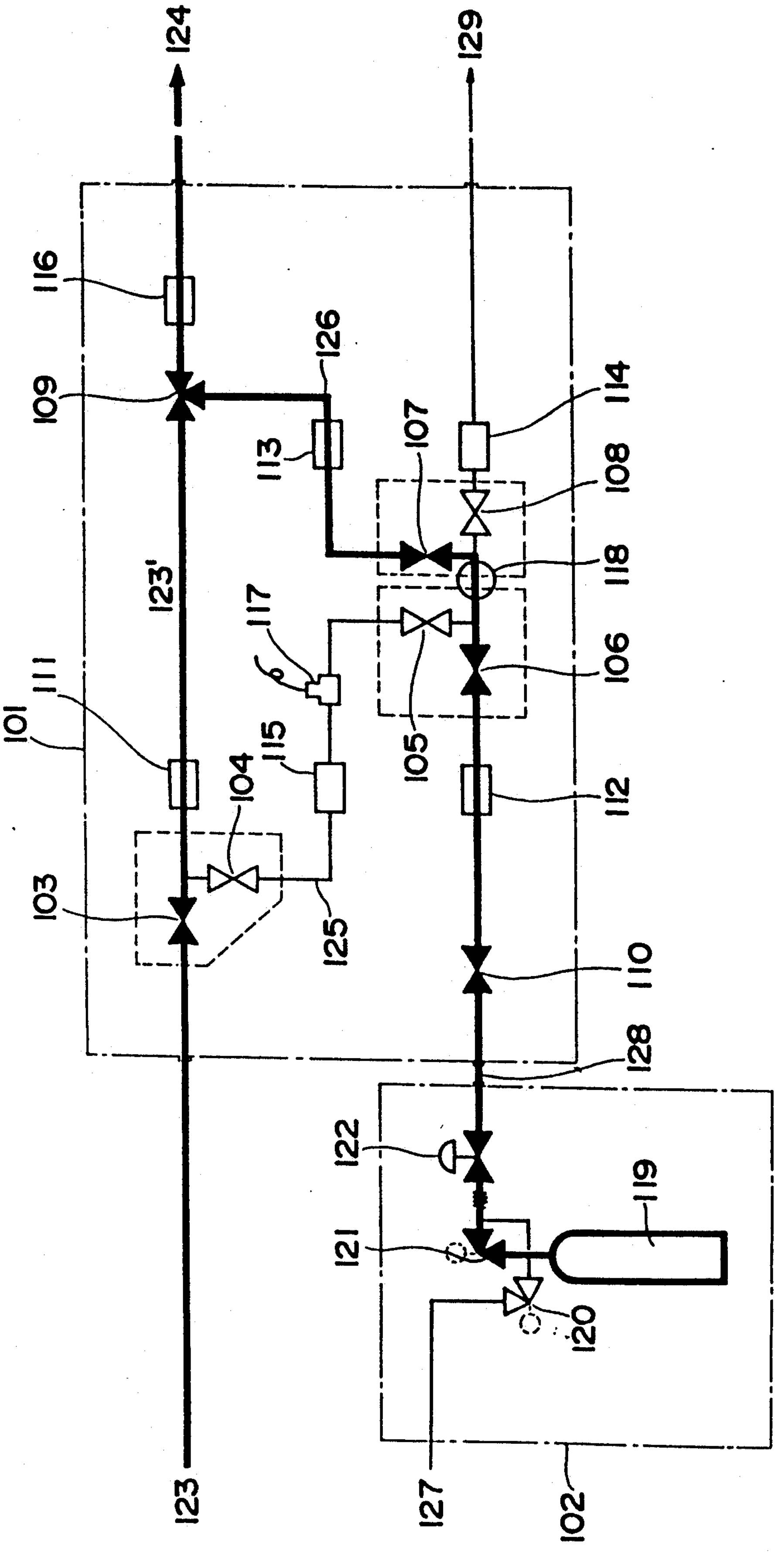
FIG. 3 is a drawing showing the flow of a gas in the case of diluting a source gas at a low dilution ratio.

FIG. 3 shows the flow of gas when a source gas at a low dilution ratio is supplied to the process apparatus. The valves 103, 106, 107, 109, 110, and 121 are opened, and with the valves 104, 105, 108 and 120 closed, a balance gas 123 is flowed through the pipe 123' and a source gas is flowed through the pipes 128 and 126, both gasses being flowed at a flow rate set by the respective mass flow controllers 111 and 112, thereby supplying a process gas diluted to a predetermined concentration to the process gas supplying pipe 124. Denoting the flow rate of the mass flow controller 111 with $Q_1$ [l/min], the flow rate of the Pressure adjuster 122 with $Q_2$ [l/min], the flow rate of the mass flow meter 116 (process gas supplying flow rate) with QT [l/min] and the dilution ratio with A %, $Q_1$ and $Q_2$ can be calculated by the following equations (1) and (2):

$$Q_1+Q_2=Q_T \quad (1)$$

$$100\times Q_1/(Q_1+Q_2)=A \quad (2)$$

Figure 4:
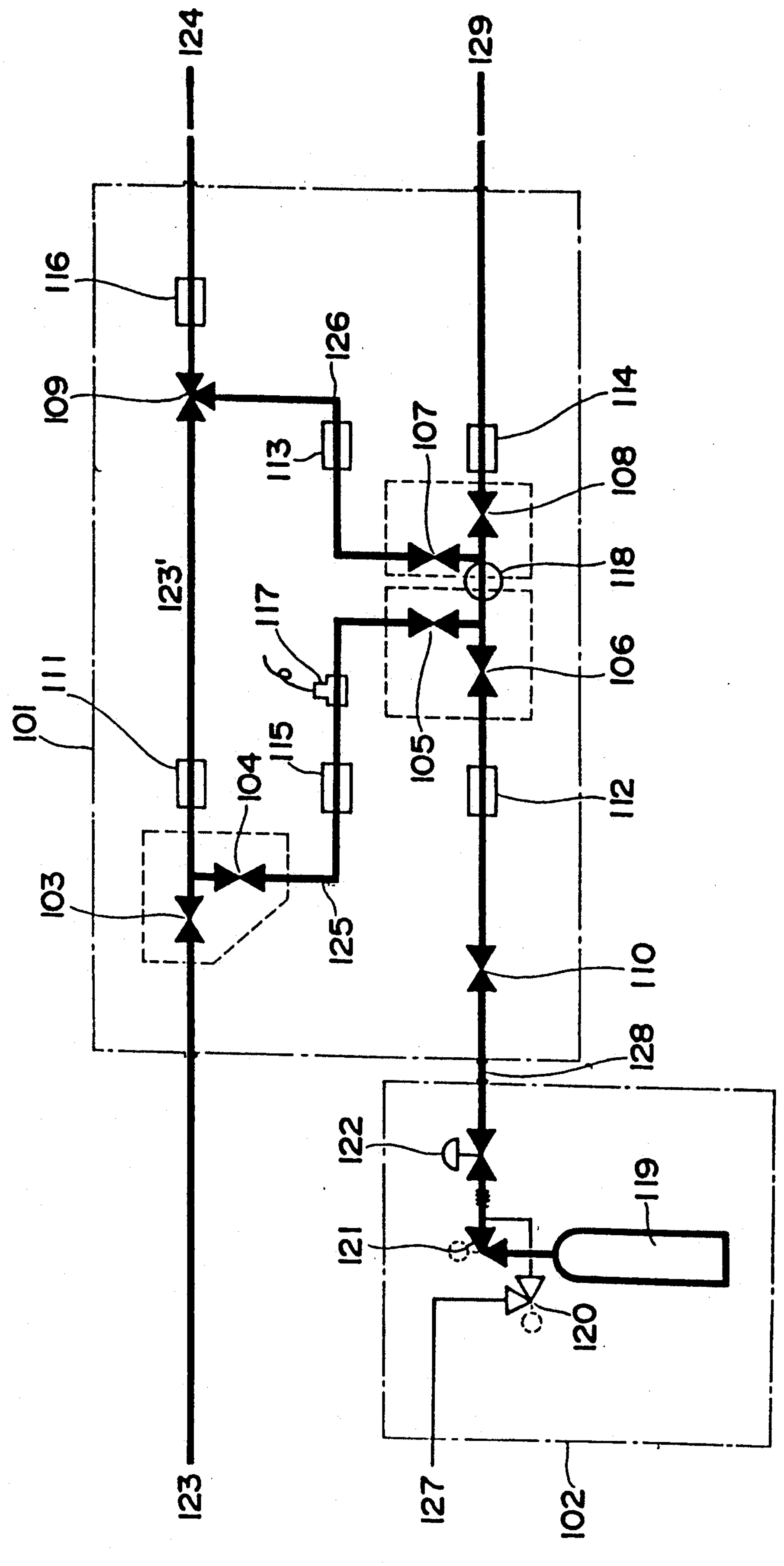
FIG. 4 is a drawing showing the flow of a gas in the case of diluting the source gas at a high diluting ratio.

FIG. 4 shows the flow of gas when a source gas at high dilution rate is supplied to the process apparatus. The valves 103, 104, 105, 106, 107, 108, 109, 110 and 121 are opened, and with the valve 120 closed, a balance gas is supplied to the supplying pipe 123 and the branching pipe 125, and a source gas is supplied to the pipe 128, which is diluted with the balance gas from the pipe 125, such as Ar, $H_2$, $N_2$, He or the like and made to flow to the diluting gas supplying pipe 126 and exhausting pipe 129 at a predetermined rate. Moreover, after diluting the gas supplied from the diluting gas supplying pipe 126 with the balance gas of the supplying pipe 123', such as Ar, $H_2$, $N_2$, He or the like, a process gas diluted to a predetermined concentration is supplied to the process gas supplying pipe 124 at a predetermined flow rate. The setting of dilution ratio and that of the process gas supplying flow rate are achieved by setting the mass flow controllers 111, 112, 113 and 114 to a predetermined flow rate. Denoting the flow rate of the mass flow controller 111 with $Q_1$ [l/min], the flow rate of the mass flow controller 122 with $Q_2$ [l/min], the flow rate of the mass flow controller 113 with $Q_3$ [l/min], the flow rate of the mass flow controller 114 with $Q_4$ [l/min], the flow rate of the mass flow controller 115 with $Q_5$, the flow rate of the mass flow meter 116 (process gas supplying flow rate) with $Q'_T$ [l/min] and the diluting ratio with A %, and assuming that $Q_2=Q_3$, by setting $Q_4$ arbitrary, $Q_1$, $Q_2$ and $Q_3$ can be calculated by the following equations (3):

$$Q_1+Q_2=Q'_T \quad (3)$$

Since the diluting ratio of first stage, that is the diluting ratio of the source gas which flows in the film for mixing gasses 118 is expressed by $$100\times Q_2/(Q_2+Q_5)$$

the diluting ratio of second stage, that is, the diluting ratio A'% of the source gas which flows in process gas supplying line 124 is expressed by $$\{100\times Q_2/(Q_2+Q_5)\}\times(Q_3/Q'_T)=100\times Q_2\times Q_3/(Q_3+Q_4)\times(Q_1+Q_3) \quad (4)$$

with considering $Q_2+Q_5=Q_3+Q_4$.

Figure 5:
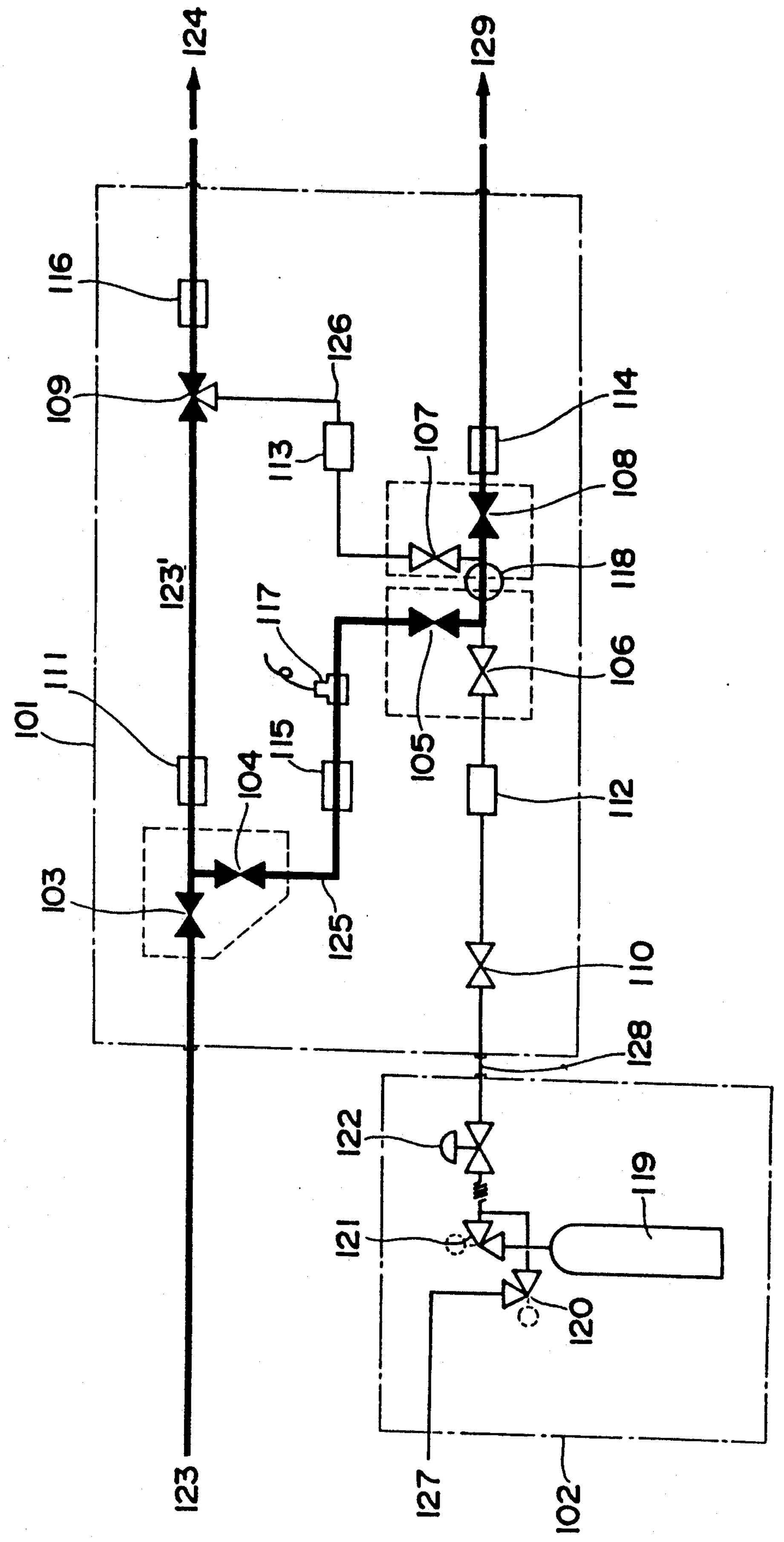
FIG. 5 is a drawing showing the flow of a gas in the case of calibrating a mass flow controller.
Figure 6:
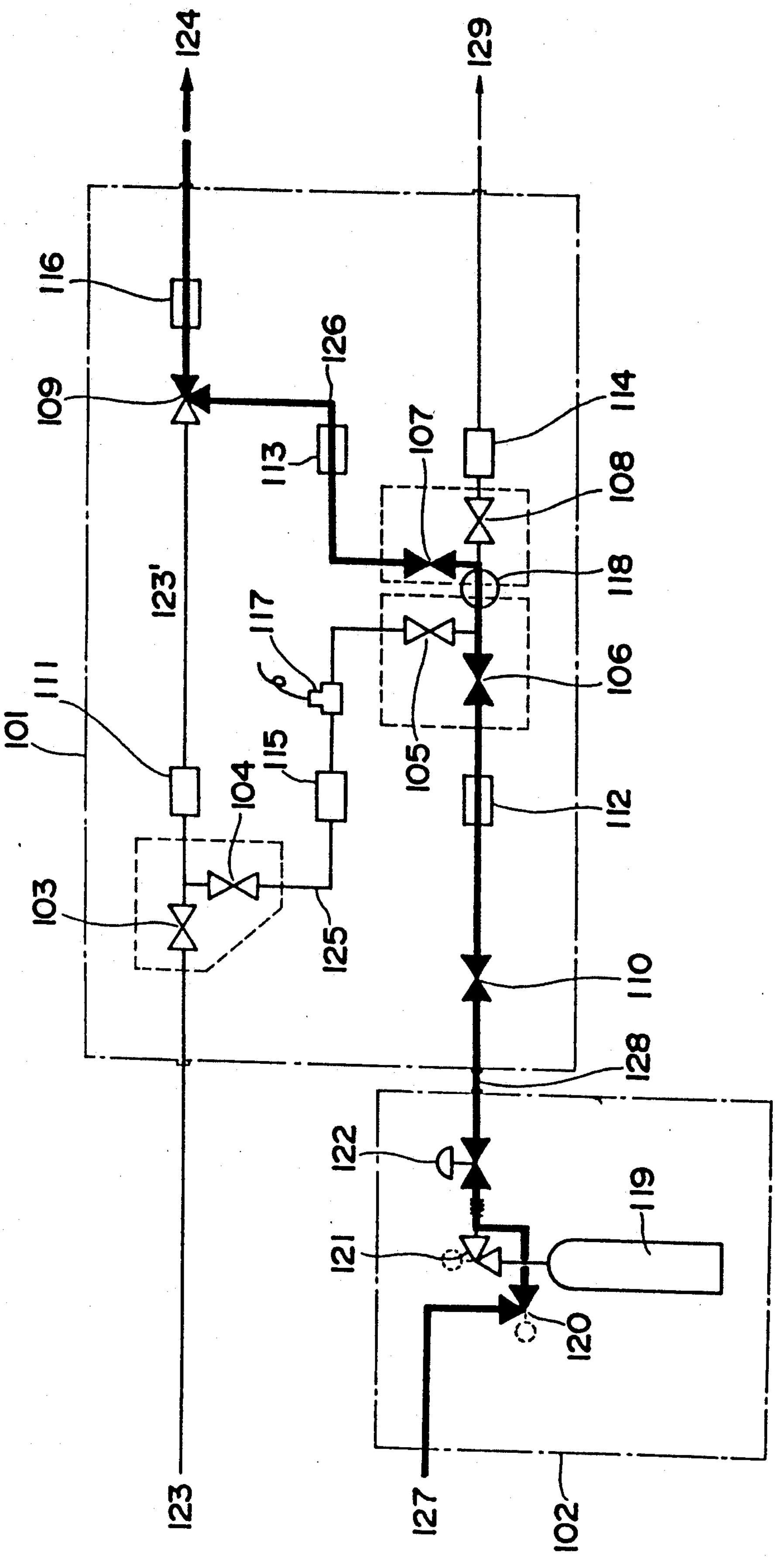
FIG. 6 is a drawing showing the flow of a gas in the case of calibrating another mass flow controller, FIG. 7 (A), (B), (C) and (D) are graphs showing the amount of detected water content in the cases that different kinds of sheet parts are respectively used, FIG. 8 (A), (B), (C) and (D) are graphs showing the amount of detected water content in the cases that the above sheet parts are respectively heated, FIG. 9 (A), (B), (C) and (D) are graphs showing the spectra at the above heating and, FIG. 10 is a graph showing the ionic intensity against the water content.

FIGS. 5 and 6 are drawings for explaining the self-calibrating function of the mass flow controller which the diluting apparatus of the invention has. FIG. 5 shows the flow of gas for calibrating the mass flow controllers 111 and 114, and FIG. 6 shows the flow of gas for calibrating the mass flow controllers 112 and 113. In FIG. 5, with the valves 103, 104, 105 and 108 opened and the valves 106, 107, 109, 110, 120 and 121 closed, a balance gas such as Ar, $H_2$, $N_2$, He or the like is supplied through the balance gas supplying pipe 123 and respective comparison and calibration are achieved by the indication values of the mass flow controller 111 and mass flow meter 116, and the mass flow controller 114 and mass flow meter 115. In FIG. 6, with the valves 106, 107, 109, 110 and 120 opened and the valves 103, 104, 105 and 108 closed, a purge gas such as Ar, $N_2$ or the like is supplied from the purge gas supplying pipe 127, and respective comparison and correction are achieved by the indication values of the mass flow controllers 112 and 113, and the mass flow meter 116.

In the above example, explanation was made on the gas supplying from the gas cylinder. But, the present invention can also be applied to a system in which the method for supplying a gas to be diluted is different. Moreover, it is also effective to use the present invention as a process gas supplying apparatus as an apparatus for generating a standard gas to be used when calibration of a gas analyzing apparatus is made or a calibration curve is made.

Figure 10:
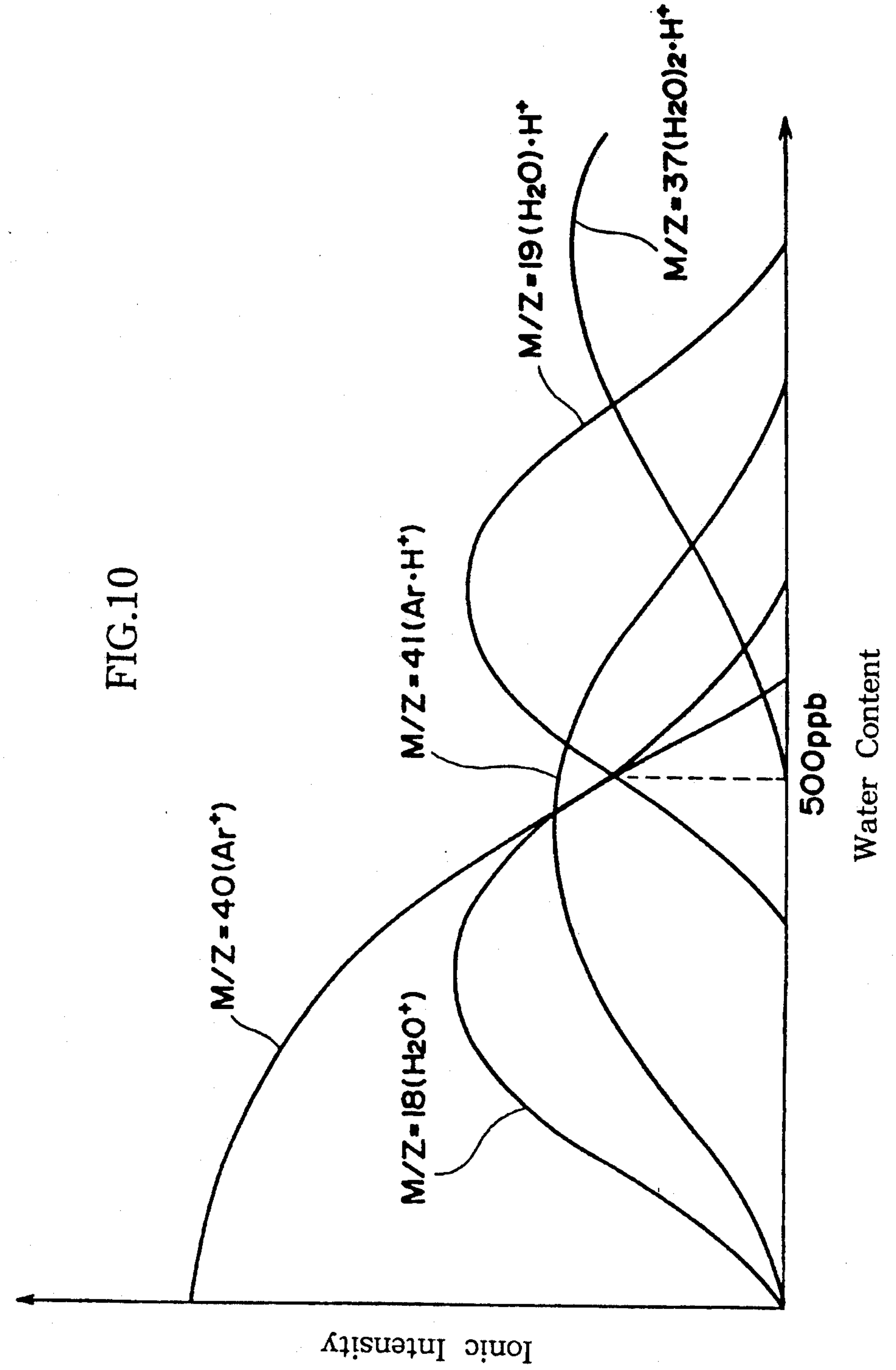

FIG. 7(A), (B), (C) and (D) show the change in water content contained in a purge gas when a metal diaphragm valve which sheet part is of different kind is purged at room temperature. The experiments were carried out by making Ar gas flow at a rate of 1.2 l/min through a metal diaphragm valve, and the water content contained in the outlet Ar gas was measured by APIMS (Ambient Pressure Ionizing Mass Spectroscopy). FIG. 10 shows the results of MID mode measurements of the APIMS (a method to simultaneously measure the behaviour of several ions). When the water content increases, the ionic intensity at M/Z=18 ($H_2O^+$), 19 ($H_2O^+$) increases, and the ionic intensity of argon as a host gas (M/Z=40; $Ar^+$) decreases. The ratio of increase and decrease in the ionic intensity is completely dependent on the water content. The measurements were started in each case two minutes after setting a sample to the measurement apparatus. The kinds of the examined metal diaphragm valves were: a conventional product in which polyimide resin was used in the sheet part (hereinafter, referred to as case 7A), a product in which polyimide resin was used in the sheet part which dead space was minimized (hereinafter, referred to as case 7B). a one obtained by coating the polyimide resin in the sheet part of the above product with metal by sputtering (hereinafter, referred to as case 7C), and a one in which the resin in the sheet part was removed to thereby make it all metal made (hereinafter, referred to as case 7D). Each of the metal diaphragm valves was subjected to the experiment after having been left in a clean room kept at 50% in relative humidity and at a temperature of 20° C. for one week.

Figure 7:
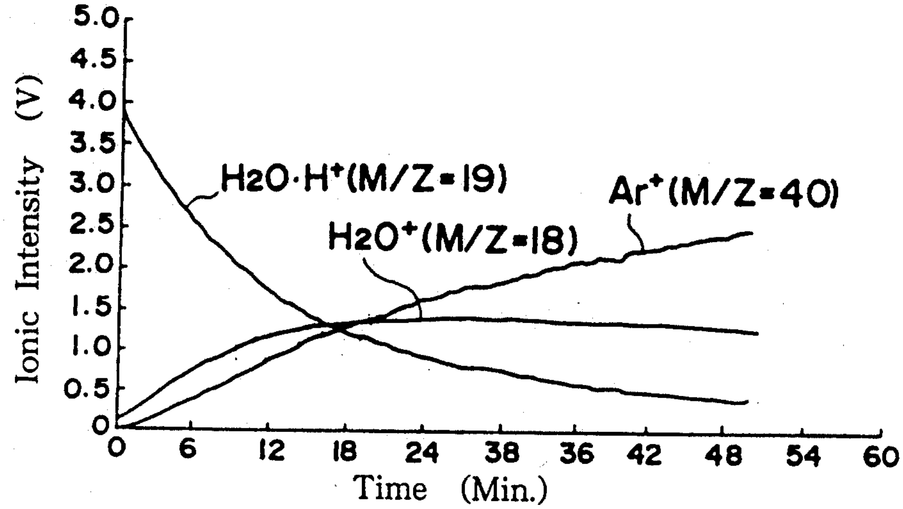
Figure 7:
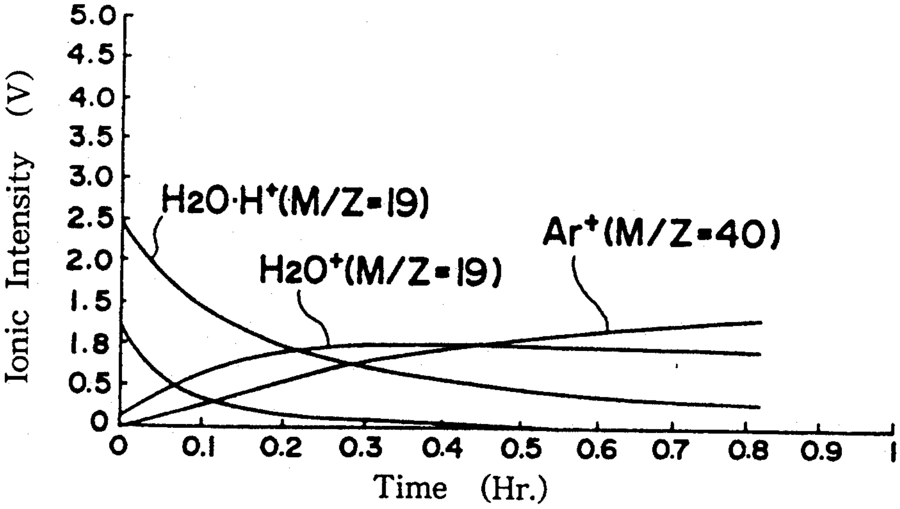
Figure 7:
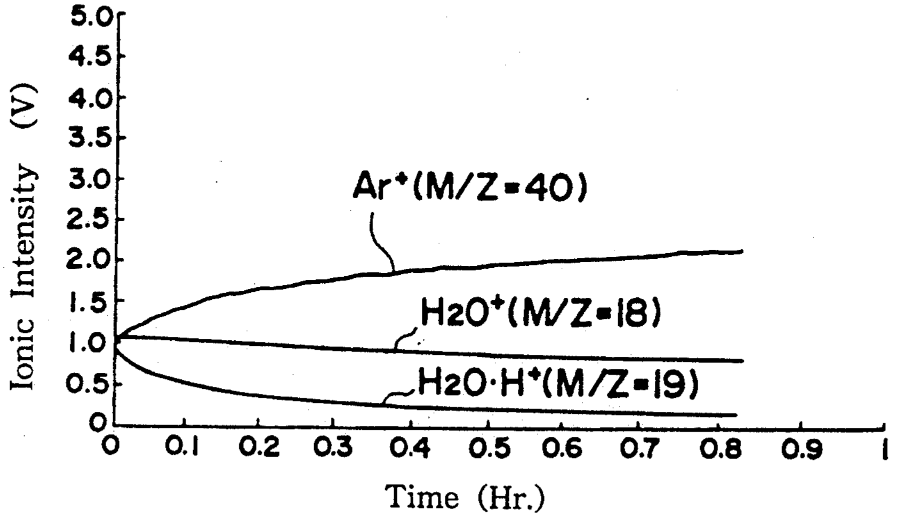
Figure 7:
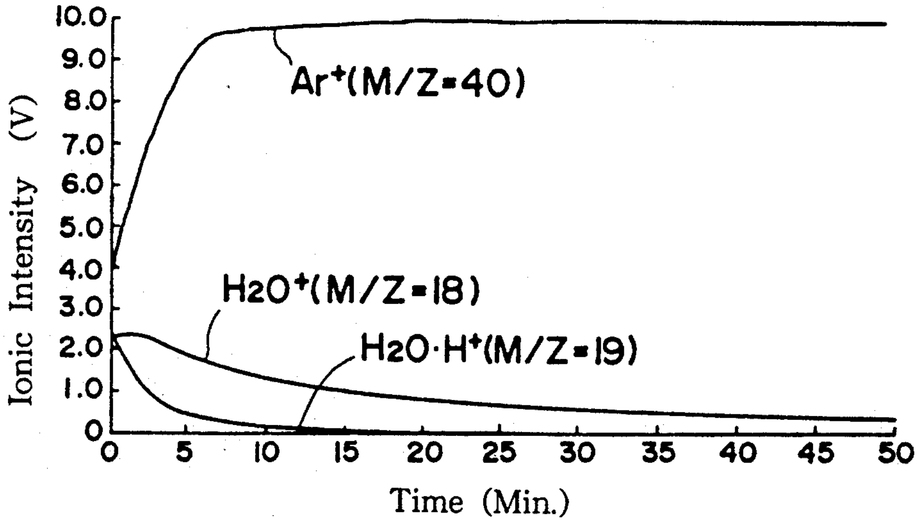

It can be seen that a considerable amount of water content is contained in each of the cases (A), (B) and (C) of FIG. 7. Even after flowing gas for about one hour, water content of about 200 ppb was detected in the above cases 7A and 7B, and a water content of about 150 ppb was detected in the case 7C, showing that the water content does not decrease easily. In contrast to this, in the case 7D in which resin was removed from the gas contacting part, the water content decreased to 16 ppb after flowing gas for one hour. Thus, it can be seen that the case 7D is superior to the cases 7A, 7B and 7C in water eliminating performance by one order of magnitude, and that it has an extraordinarily excellent characteristic to degas adsorbed gasses.

FIG. 8(A), (B), (C) and (D) show the change in water content when these valves were heated by a heater to 130° C., the change being indicated by relative ionic intensities. In the same figure, (A) (referred to as case 8A), (B) (referred to as case 8B), (C) (referred to as case 8C) and (D) (referred to as case 8D) correspond to FIG. 7(A), (B), (C) and (D), respectively. FIG. 10 is a simple graph for explaining the behaviour of the water content by APIMS. By APIMS, when the water content increases in the system, the ionic intensity of the host gas (argon in this case) decreases and water ion $H_2O^+(M/Z=18)$ in increases When 18) starts to decrease and cluster ion of water $H_2O$ $H^+(M/Z=19)$ increases. When the water content increases still further, the water cluster ion $H_2O$ $H^+(M/Z=19)$ decreases and cluster ion of water dimmer $(H_2O)_2$ $H^+(M/Z=37)$ increases.

As FIG. 8(A), (B) and (C) clearly show, a considerable amount of water is detected in each of the above cases 8A, 8B and 8C. In these valves, water content at an amount of from several thousand ppb to a percent order was released 15 minutes after starting heating, and this state continued even after heating for one hour, and continued to release water for a long time. In contrast to this, in the case of case 8D, the amount of released water is not more than 100 ppb, which is less by one or two orders of magnitude, even when heated.

Figure 8:
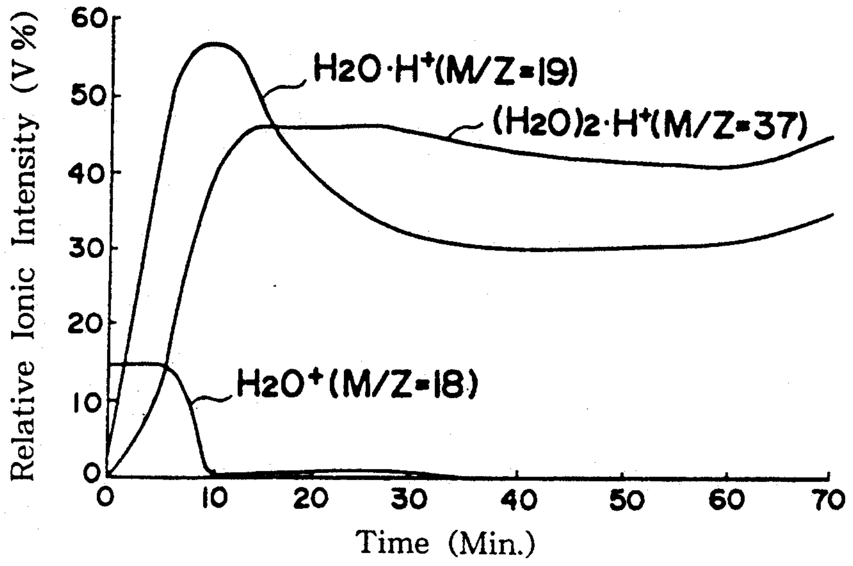
Figure 8:
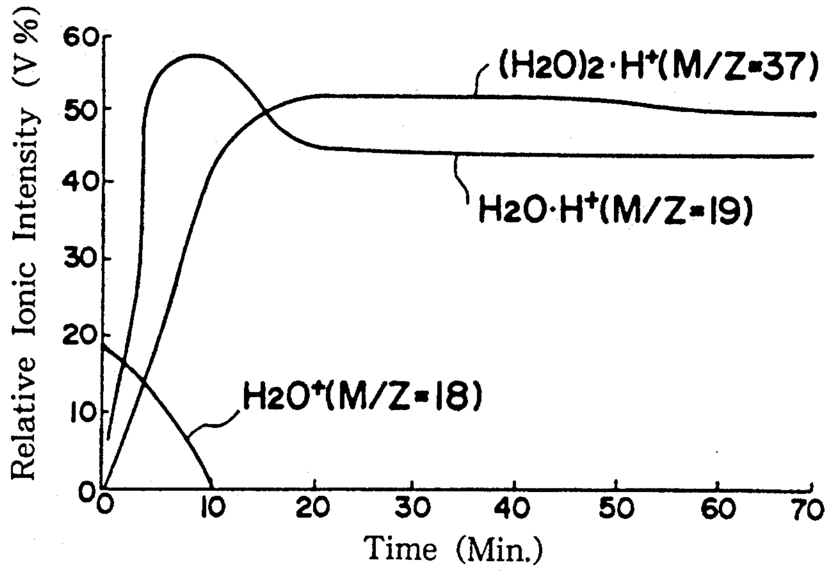
Figure 8:
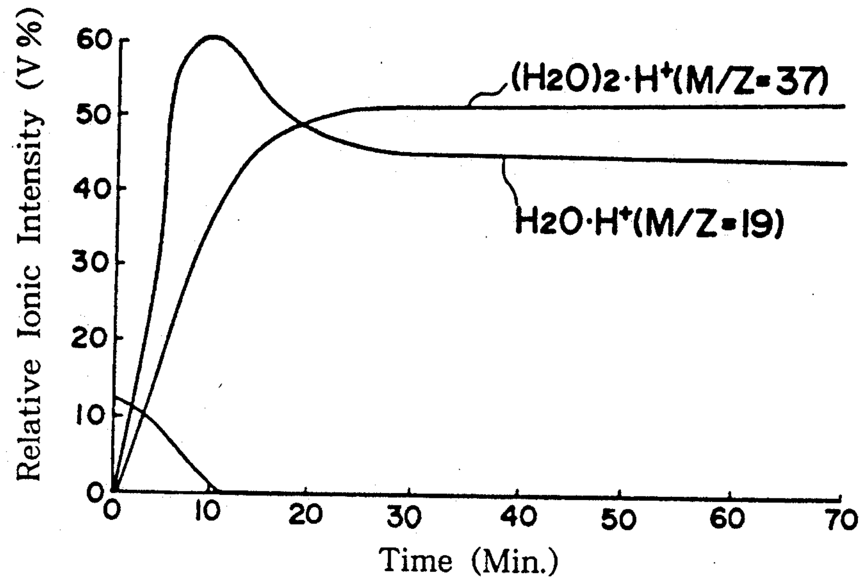
Figure 8:
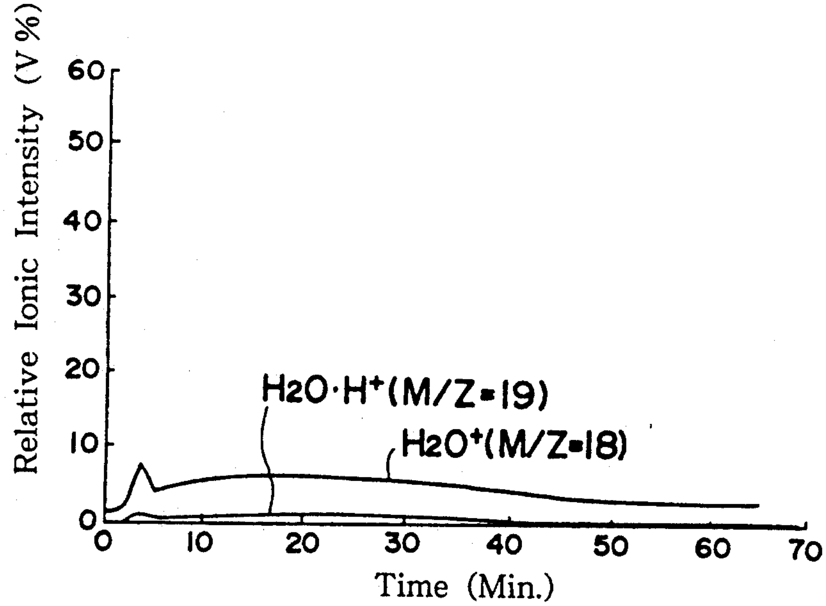
Figure 9:
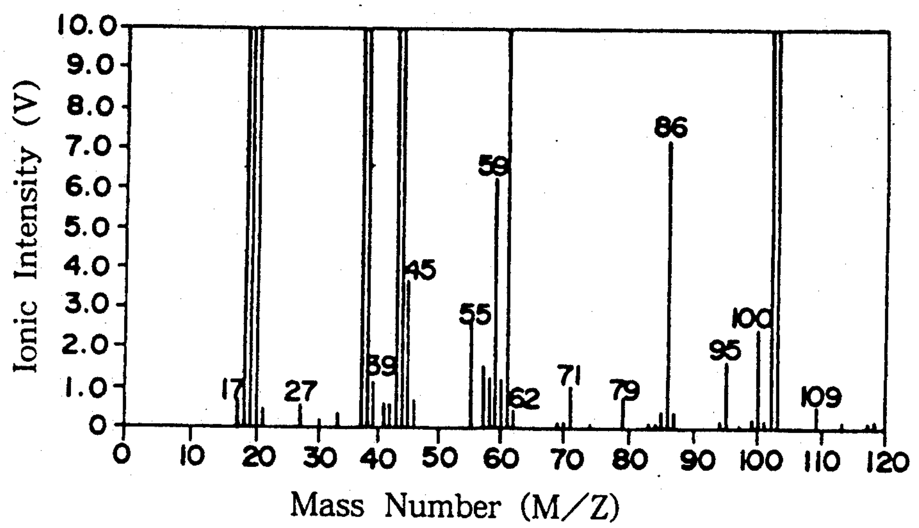
Figure 9:
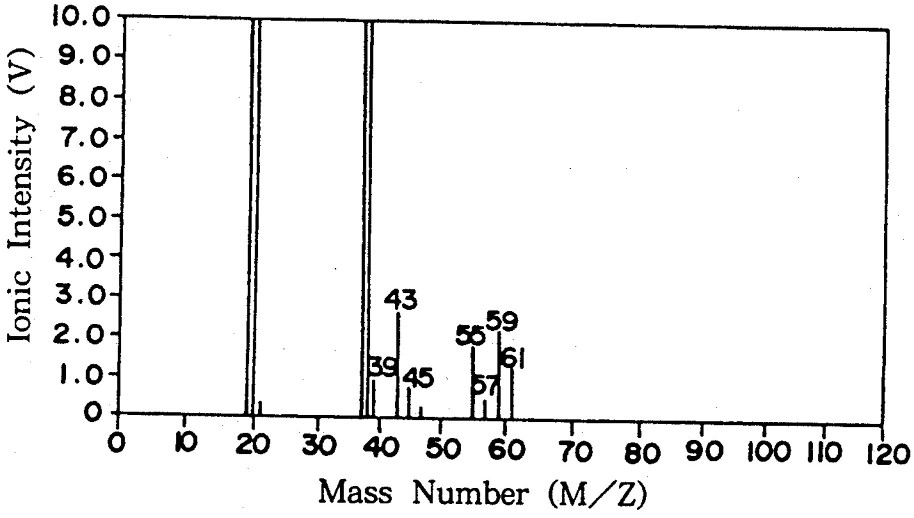
Figure 9:
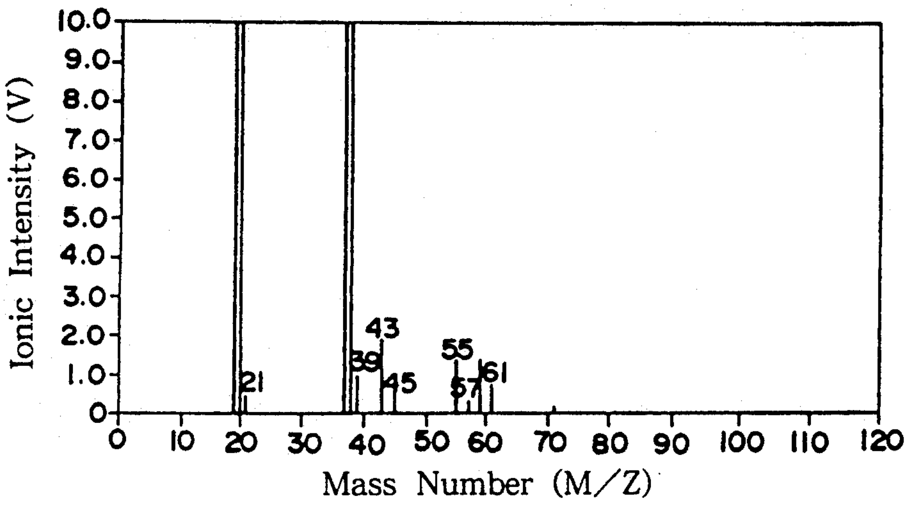
Figure 9:
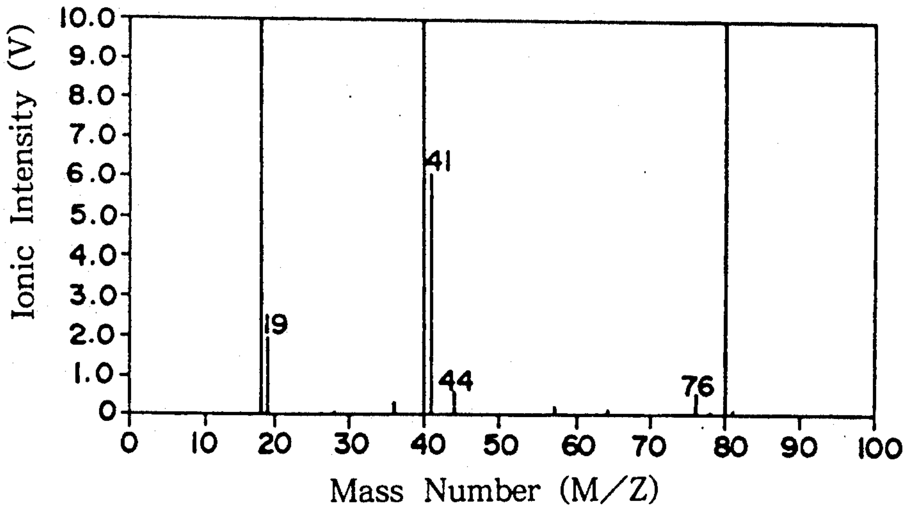

FIG. 9(A) (referred to as case 9A), (B) (referred to as case 9B), (C) (referred to as case 9C) and (D) (referred to as case 9D) are representative spectra when heated, and the cases 9A, 9B, 9C and 9D correspond to the cases 8A, 8B, 8C and 8D in FIG. 8, respectively. In the case of the above cases 9A, 9B and 9C, due to the influence of the water content released at a large amount, not only was no peak of the host gas (argon gas)-detected, but materials considered to be organic materials with M/Z=43, 45, 49, 61 and 71 were detected. In contrast to this, in case 9D, a peak corresponding to the host gas (argon gas) was detected (M/Z=40, 80), and other than water, only a very small amount of air content, such as $CO_2$ with M/Z=44, was detected. It was found that when there was contained no organic compound in the gas contacting part as in case 9D, not only was a very small amount of water released, but also no organic compound, which have bad influences on the semiconductor processes, was detected.

Moreover, as for a filter, such a ceramic filter has been developed that employs inorganic ceramic material as an element, and a nickel packing can be used as its gasket, so that organic resin, which has been used conventionally, can be eliminated from the gas contacting part. Furthermore, by fabricating an element using a stainless steel and junctioning it with a housing by welding, an all metal filter which is composed of a stainless steel at every part has been developed.

Application to Industries

As described above, according to the invention without providing any chance for air contamination, a source gas can be diluted with a diluting gas to a desired concentration.

Moreover, according to the inventions there is no influence of released gasses, such as organic gasses, so that a process gas can be supplied to a process apparatus while keeping a high purity.

Furthermore, according to the invention of claim 5, a step-wise dilution Of a source gas can be achieved efficiently. Furthermore, by constructing the gas supplying system of the invention using metal or a ceramic material at every part, it is possible to provide a metal passivation treatment, such as oxidation passivation and fluorination passivation, which is excellent in water elimination, gas emission characteristics and resistance to corrosion, so that a time for purging the piping after construction is shortened and a high purity process gas can be supplied to a process apparatus in a short time. Herein, as for the formation of an oxidation passivated film, thermal oxidation passivation treatment is particularly effective. In this case, it is more preferable to electrolytic polish so that a predetermined evenness is obtained and to carry out the oxidation passivation under a high purity oxygen atmosphere.

What is claimed is:

1. A process gas supply apparatus comprising:
- a source gas supply line;
- a diluting gas supply line;
- a first connecting line for connecting said source line to said diluting line, wherein a first end of said first connecting line is connected to said source line at a first three-way valve and a second end of said first connecting line is connected to said diluting line at a second three-way valve;
- a second connecting line downstream of said first connecting line for connecting said source line to said diluting line, wherein a third end of said second connecting line is connected to said source line at a third three-way valve and a fourth end of said second connecting line is connected to said diluting line at a fourth three-way valve;
- a process gas supply line for supplying a process gas diluted to a predetermined concentration to a process apparatus, said process gas supplying line being connected to one of said third three-way valve and said fourth three-way valve;
- an exhaust line for supplying exhaust gas to an exhaust gas treating apparatus, said exhaust line being connected to one of said third three-way valve and said fourth three-way valve;

a first selectively adjustable flow adjuster in said source line, said first flow adjuster being upstream of said first connecting line;

a second selectively adjustable flow adjuster in said exhaust line;

a third selectively adjustable flow adjuster in said diluting line between said second three-way valve and said fourth three-way valve;

and a fourth selectively adjustable flow adjuster in said second connecting line between said third three-way valve and said fourth three-way valve.

2. The process gas supply apparatus of claim 1, wherein said first three-way valve and said second three-way valve are positioned to prevent a flow of gas through said first connecting line, and wherein said third three-way valve and said fourth three-way valve are positioned to permit the flow of gas through said second connecting line, wherein a flow of gas is supplied to said process gas supply line, said gas having a first dilution factor.

3. The process gas supply apparatus of claim 2, wherein said third three-way valve is positioned to prevent the flow of gas to the exhaust gas treating apparatus.

4. The process gas supply apparatus of claim 2, wherein each of said three way valves are positioned to permit the flow of gas through both said first connecting line and said second connecting line, wherein a flow of gas through said process gas supply line has a second dilution factor.

5. The process gas supply apparatus of claim 4, wherein said second dilution factor is greater than said first dilution factor.

6. The process gas supply apparatus of claim 1, wherein each said flow adjuster is a mass flow controller.

7. The process gas supply apparatus of claim 1, wherein said source line, diluting line, first connecting line, second connecting line, process gas supplying line, and exhaust line comprise a gas contacting part, said gas contacting part being made of a material that releases minimal organic materials upon contact with said gas.

* * * * *